(12) United States Patent
Seifert et al.

(10) Patent No.: US 8,078,759 B2
(45) Date of Patent: Dec. 13, 2011

(54) METHOD FOR PREFETCHING OF STRUCTURED DATA BETWEEN A CLIENT DEVICE AND A SERVER DEVICE

(75) Inventors: Nils Seifert, Berlin (DE); Jörg Ott, Bremen (DE)

(73) Assignee: Tellique Kommunikationstechnik GmbH, Berlin (DE)

( * ) Notice: Subject to any disclaimer, the term of this patent is extended or adjusted under 35 U.S.C. 154(b) by 1846 days.

(21) Appl. No.: 10/702,079

(22) Filed: Nov. 6, 2003

(65) Prior Publication Data

US 2004/0215717 A1    Oct. 28, 2004

(30) Foreign Application Priority Data

Nov. 6, 2002  (DE) ................................. 102 52 017
Jun. 18, 2003 (DE) ................................. 103 27 876

(51) Int. Cl.
   *G06F 15/16* (2006.01)
(52) U.S. Cl. ........................ 709/246; 709/232
(58) Field of Classification Search .................. 709/232, 709/246; 792/232
   See application file for complete search history.

(56) References Cited

U.S. PATENT DOCUMENTS

| | | | | |
|---|---|---|---|---|
| 5,347,632 A * | 9/1994 | Filepp et al. | ................... | 709/202 |
| 5,388,097 A * | 2/1995 | Baugher et al. | ................ | 370/455 |
| 5,696,966 A * | 12/1997 | Velarde | ........................... | 707/10 |
| 5,864,852 A * | 1/1999 | Luotonen | ........................ | 726/14 |
| 5,913,025 A * | 6/1999 | Higley et al. | ..................... | 726/4 |
| 5,924,116 A * | 7/1999 | Aggarwal et al. | ............. | 711/122 |
| 5,937,160 A * | 8/1999 | Davis et al. | .................... | 709/203 |
| 6,026,413 A * | 2/2000 | Challenger et al. | ........... | 707/202 |
| 6,065,058 A * | 5/2000 | Hailpern et al. | ............... | 709/231 |
| 6,067,623 A * | 5/2000 | Blakley et al. | ...................... | 726/5 |
| 6,076,166 A | 6/2000 | Moshfeghi et al. | | |
| 6,539,380 B1 * | 3/2003 | Moran | .............................. | 707/9 |
| 6,578,113 B2 * | 6/2003 | Krishnamurthy et al. | .... | 711/141 |
| 6,728,785 B1 * | 4/2004 | Jungck | ........................... | 709/247 |
| 6,751,608 B1 * | 6/2004 | Cohen et al. | .......................... | 1/1 |
| 6,775,692 B1 * | 8/2004 | Albert et al. | ................... | 709/207 |
| 6,845,106 B2 * | 1/2005 | McKinnon et al. | ........... | 370/477 |
| 6,868,439 B2 * | 3/2005 | Basu et al. | ..................... | 709/213 |
| 6,912,591 B2 * | 6/2005 | Lash | ............................. | 709/246 |
| 7,099,914 B1 * | 8/2006 | Hartmann et al. | ............ | 709/203 |
| 7,185,082 B1 * | 2/2007 | del Val et al. | ................. | 709/224 |
| 7,441,012 B2 * | 10/2008 | Palevich et al. | ............... | 709/217 |

(Continued)

FOREIGN PATENT DOCUMENTS

DE      100 39 901 A      2/2002

(Continued)

OTHER PUBLICATIONS

Droms, R. "Dynamic Host Configuration Protocol".[online] Mar. 1997.[retrieved on Mar. 22, 2009] Bucknell University, Request for Comments: 2131 [Retrieved From: http://www.faqs.org/ftp/rfc/pdf/rfc2131.txt.pdf].*

(Continued)

*Primary Examiner* — Philip Chea
*Assistant Examiner* — Eric W Shepperd
(74) *Attorney, Agent, or Firm* — Smith Patent Office

(57) ABSTRACT

The invention relates to a method of more efficient data transmission, in particular transmission of structured data, such as web pages, in a system comprising a server means and a client means which are interconnected via a plurality of proxy means, including a server proxy means and a client proxy means.

38 Claims, 5 Drawing Sheets

U.S. PATENT DOCUMENTS

| | | | | |
|---|---|---|---|---|
| 2001/0037294 | A1* | 11/2001 | Freishtat et al. | 705/39 |
| 2002/0007404 | A1* | 1/2002 | Vange et al. | 709/217 |
| 2002/0194382 | A1* | 12/2002 | Kausik et al. | 709/246 |
| 2004/0010585 | A1* | 1/2004 | Jones et al. | 709/224 |

FOREIGN PATENT DOCUMENTS

| | | | |
|---|---|---|---|
| DE | 10039901 A1 * | 2/2002 | |
| EP | 1 206 100 A | 5/2002 | |
| EP | 1206100 A1 * | 5/2002 | |
| EP | 1398715 A2 | 3/2004 | |
| WO | 9908429 A1 | 2/1999 | |
| WO | WO 99 08429 A | 2/1999 | |
| WO | WO 99 64967 A | 12/1999 | |
| WO | WO 00 73922 A | 12/2000 | |
| WO | WO 01 14990 A | 3/2001 | |
| WO | WO 0114990 A1 * | 3/2001 | |
| WO | 0193092 A1 | 12/2001 | |
| WO | 0235795 A1 | 5/2002 | |
| WO | 02077756 A2 | 10/2002 | |

OTHER PUBLICATIONS

Seifert, Nils. "EPO automated translation of DE10039901".[online] Feb. 28, 2002. [Retrieved on Mar. 18, 2009], European Patent Office. [Retrieved From: http://epo.worldlingo.com/wl/epo/epo.html?SEED=DE10039901&SEED_FORMAT=E&Action=Description&OPS=ops.espacenet.com&LOCALE=en_EP&T=1].*

D. Duchamp, Prefetching Hyperlinks, Proceedings of the 2nd USENIX Symposium on Internet Technologies & Systems, Boulder, Colorado, USA, Oct. 11-14, 1999, 13 pages.

M. Liljeberg et al., Enhanced Services for World-Wide Web in Mobile WAN Environment, Report C-1996-28, University of Helsinki, Department of Computer Science, Apr. 1996, 15 pages.

A. Chrungoo et al., Smart proxy: reducing latency for HTTP based Web transfers acrosssatellite links, Proceedings of 2000 IEEE International Conference on Personal Wireless Communications, 2000, p. 572-576.

E. Rescorla et al., SSLACC: A Clustered SSL Accelerator, Proceedings of the 11th USENIX Security Symposium, San Francisco, California, USA, Aug. 5-9, 2002, 20 pages.

A. Bishop, WWWOFFLE, Version 2.7e, 2002, 11 pages.

A. Bishop, WWWOFFLE, Version 2.6c, 2001, 4 pages.

A. Bishop, WWWOFFLE, Version 2.7, Feb. 2002, 10 pages.

A. Bishop, WWWOFFLE, Version 2.7, Oct. 2002, 10 pages.

A. Bishop, WWWOFFLE Homepage, 2009, 4 pages.

News File (link from page 4 of A. Bishop, WWWOFFLE Homepage, 2009), 24 pages.

R. Fielding et al., Hypertext Transfer Protocol—HTTP/1.1, Network Working Group, Request for Comments 2616, 1999, p. 1-176.

C. Brooks et al., Application-Specific Proxy Servers as HTTP Stream Transducers, 4th International World Wide Web Conference, 1995, 12 pages.

A. Bishop, WWWOFFLE, Version 2.7f—Open Source Code, 2002, 19 pages.

D. Postel et al., Internet Protocol, DARPA Internet Program, Protocol Specification, Information Sciences Institute, University of Southern California, California, USA, Sep. 1981, 43 pages.

K.Egevang et al., The IP Network Address Translator (NAT), Network Working Group, Request for Comments 1631, May 1994, 9 pages.

R. Droms, Dynamic Host Configuration Protocol, Network Working Group, Request for Comments 1531, Oct. 1993, 33 pages.

H. Damker et al., Verbraucherschutz im Internet, DuD-Aufsatze, 1997, p. 24-29, V. 21.

Spuren im Netz, Government Computing, 2002, No. 08/02, Germany.

Brian DK Online, cookies—comp.infosystems.www.authoring.cgi Google Groups, 1997.

D. Kristol et al., Network Working group, Request for Comments: 2109, Category: Standard Track, HTTP State Management Mechanism, http://www.rfc-editor.org/rfc/rfc2109.txt, 1997.

R. Fielding et al., Network Working group, Request for Comments: 2616, Obsoletes: 2068, Category: Standard Track, Hypertext Transfer Protocol—HTTP/ 1.1., 1999.

M. Rabinovich et al., Web Caching and Replication, Addision-Wesley, 2002, p. 253.

* cited by examiner

METHOD FOR PREFETCHING OF STRUCTURED DATA BETWEEN A CLIENT DEVICE AND A SERVER DEVICE

BACKGROUND OF THE INVENTION

1. Field of the Invention

The invention relates to the field of transmitting structured datasets between client and server means.

2. Discussion of the Related Art

A structured dataset in particular may be a web page composed of a base file and a number of subfiles, as diagrammatically shown in FIG. 2. The web page illustrated is described in the base file x0 (for instance, in the Hypertext Markup Language, HTML), and the base file may contain references to other objects potentially needed for presenting the web page. Such additional objects especially may exist in the form of files which then are referred to as subfiles (to the base file). FIG. 2 shows eight such objects (subfiles) x1, ..., x8. The objects may be text objects, picture objects, graphics, audio, video objects, etc. and furthermore they, too, may contain structured information (e.g. in HTML) which in turn likewise may include references to further subfiles, just like the base file. This nesting may be continued recursively. The number of subfiles and their nesting depth per web page may be arbitrary as needed and may be different for different sites.

A prior art method of this kind is described in DE 100 39 901. Moreover, DE 100 39 901 describes a method which, by resorting to a client proxy means and a server proxy means, allows much faster transmission through transmission networks in which, for example, transmission delays are great. Such transmission networks with disadvantageous great delays in transmitting, for instance, may be satellite networks.

An example of the prior art which existed prior to document DE 100 39 901 and was critically assessed in that publication is illustrated in FIG. 3. A client means (such as a web browser) accesses a server means (such as a web server) through two simple proxy means e.g. on the internet, for instance, in order to fetch a web page structured, for example, as illustrated in FIG. 2. Communication between client and server means takes place especially through a network having a high transmission time (e.g. a satellite network). When accessing the web page, the client means first sends a request for the base file x0 and then receives it in a first reply from the server means. Thereupon, the client means analyzes the base file x0 and finds a number of embedded objects x1, ..., x8 which it subsequently fetches in two rounds from the server means. Due to the high transmission time within the network, the operation from the first inquiry for the web page to the complete presentation in the client means takes very long.

According to DE 100 39 901 this state of the art is improved by introducing a distributed proxy consisting of a client proxy means and a server proxy means, as illustrated in FIG. 4. Here, both the client and the server proxy means may be placed so as to enclose the network with great transmission delay. As may be gathered from FIG. 4 (and described in detail in DE 100 39 901), the efficiency in accessing structured datasets is improved by a request (A) which causes the analysis of a base file x0 (and corresponding subfiles) to be undertaken additionally (C) in the server proxy means after the base file has been received (B) from the server means and before, during, or after it is forwarded (D) to the client proxy means. The server proxy means independently demands (E) the objects thus located (in this example subfiles x1, ..., x8) from the server means, and the objects obtained from the server means likewise are forwarded (F) to the client proxy means, even if they have not yet been asked for. The objects (files, subfiles) received from the server proxy means are buffered in the client proxy means and, thereafter, any requests from the client means for these objects are answered (G) out of the memory means. This way of proceeding will be referred to below as "prefetching" since subfiles or objects are prerequested from a server means.

SUMMARY OF THE INVENTION

Starting from the state of the art, there is need for a method which will provide further optimization as regards the efficiency and speed of transmitting structured datasets, especially in the context of transmitting web pages from the internet, between client and server means and a transmission network connected in between.

It is another object to make accesses by an intermediate client proxy means or an intermediate server proxy means to the surrounding network comprehensible and/or traceable unambiguously, if at all possible, to a particular client means.

And, furthermore, it is an object to permit the least possible/shortest possible utilization and/or loading of the backward transmission direction. The underlying reason is that, when receiving data in one direction, often data in addition must be exchanged in rear direction. The data exchanged in rear direction, for example, may be demands for objects and especially subobjects or confirmations/acknowledgements or handshakes within the data exchange.

The objects are met by methods as recited in the independent claims.

BRIEF DESCRIPTION OF THE DRAWINGS

The aspects of the invention will be described in greater detail, by way of embodiments, with reference to the accompanying drawing, in which.

DETAILED DESCRIPTION OF THE PREFERRED EMBODIMENTS

Various aspects of the invention will be discussed in detail below; the features of the various aspects may be significant for implementing the invention in its various embodiments, both individually and in any combination. In particular, the various aspects each independently present an essential improvement of the state of the art.

To facilitate the understanding of the various aspects of the invention, in each case first, the background (section (i)) of the aspect will be dealt with briefly, next the specific problems will be discussed (section (ii)) as well as one or more preferred embodiments of the aspect of the invention (section (iii)). For some of the aspects of the invention, modifications will be described in a section (iv), some of them being alternatives.

Figure 1:
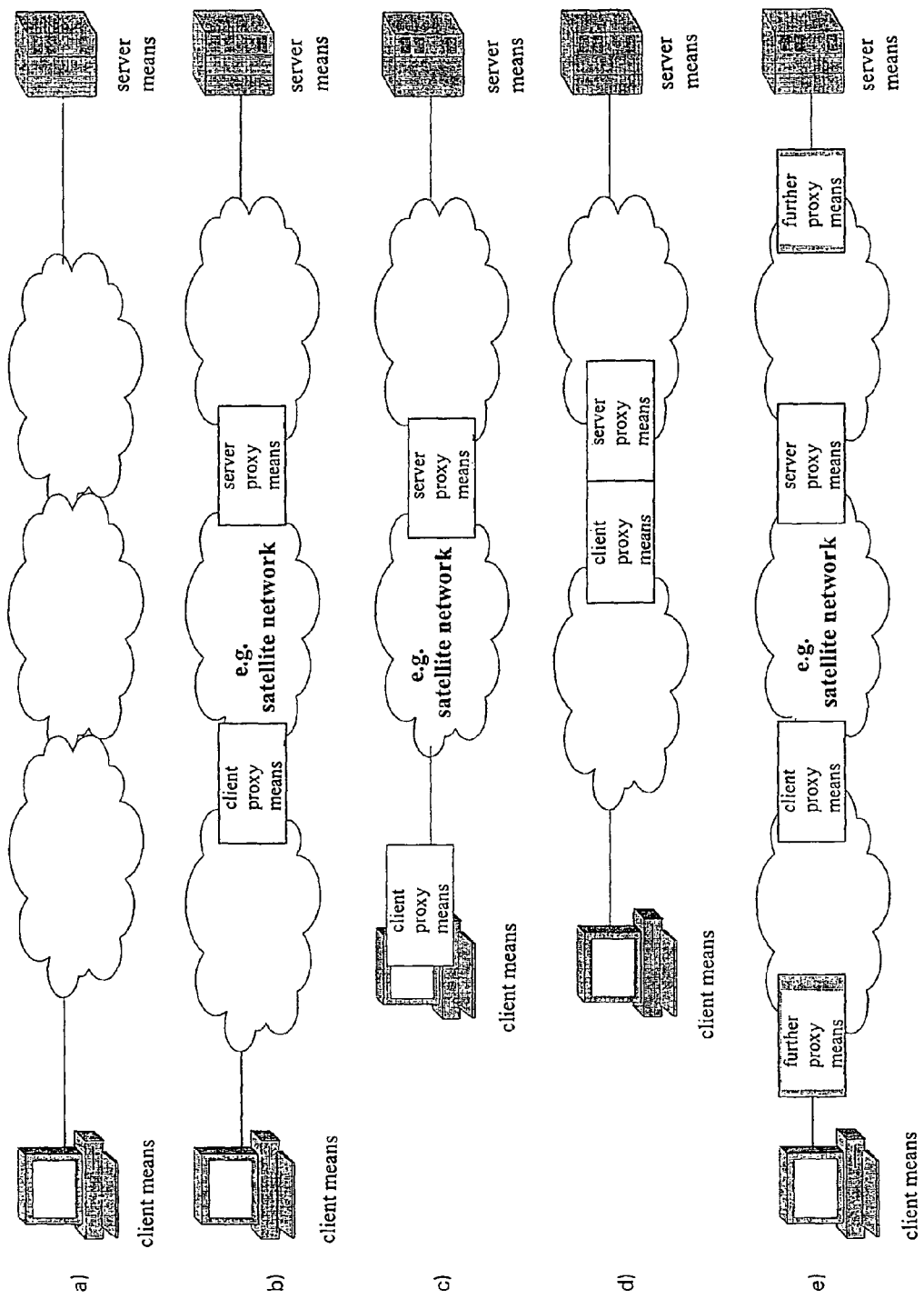
FIG. 1 is a diagrammatic presentation showing a plurality of systems for data transmission, comprising a client means and a server means.
Figure 2:
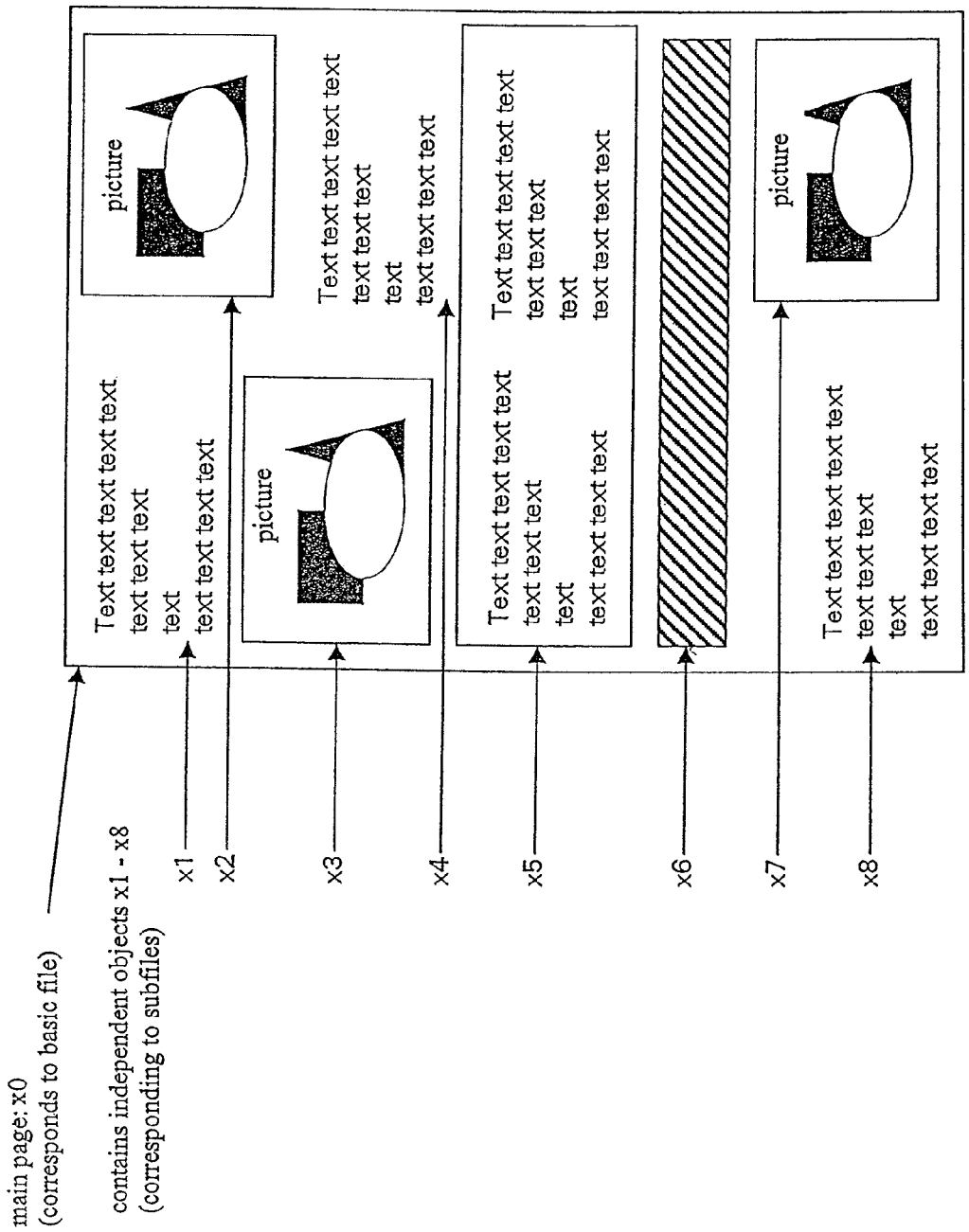
FIG. 2 is a diagrammatic presentation showing a structured dataset relating to a web page.
Figure 3:
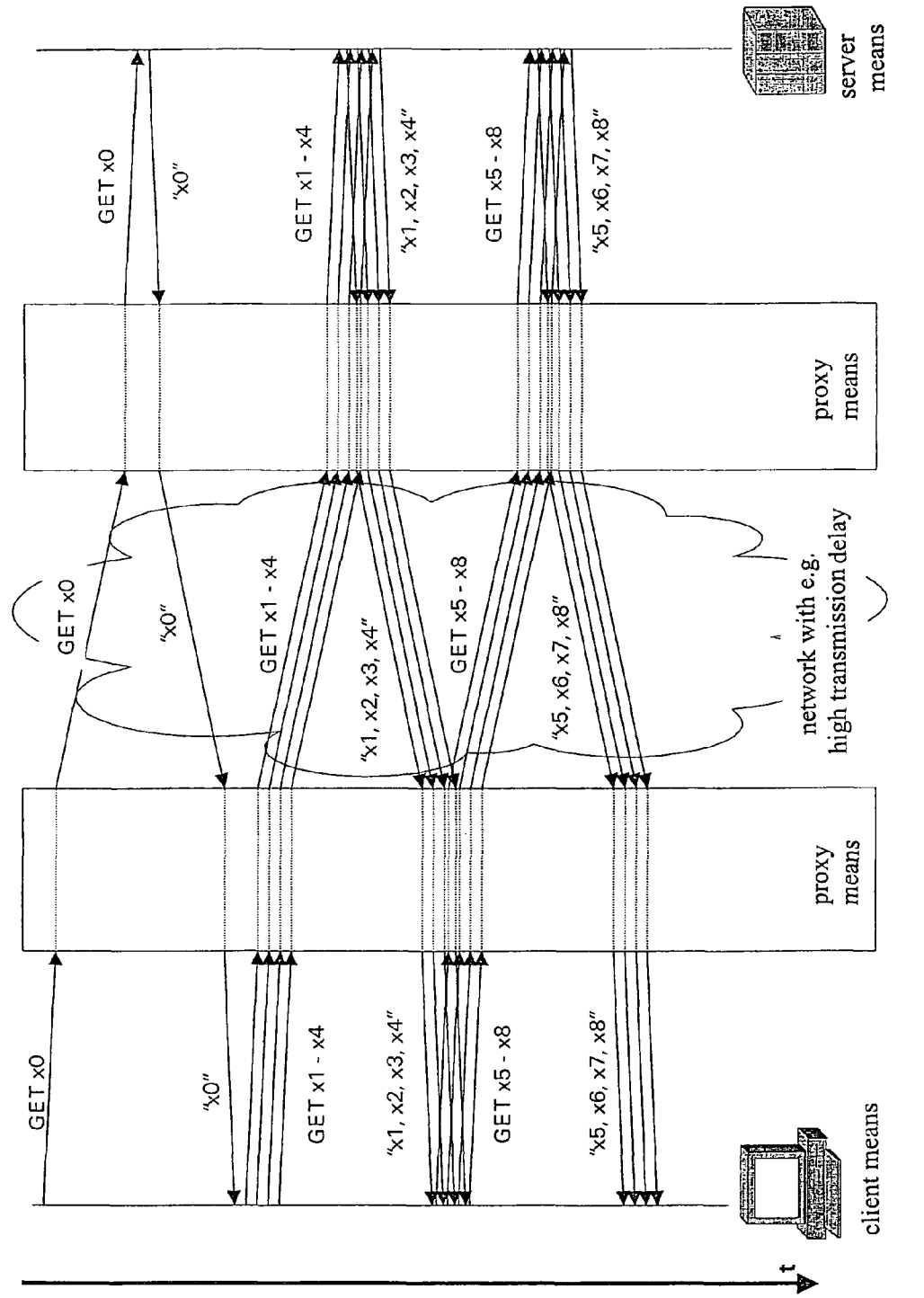
FIG. 3 is a diagrammatic presentation to explain a known method of data transmission between a client means and a server means.

One possible arrangement, including the client proxy means and the server proxy means, is illustrated in FIG. 1. FIG. 1a) shows the general communication path between a client means and a server means through one or more networks. FIG. 1b) shows utilization of the client proxy means and the server proxy means for optimizing communication via a network which has a high transmission time (e.g. a satellite network), the client proxy means and the server proxy means enclosing the network with the high transmission time. Communication with the client means and the server means, respectively, takes place through another communications network. FIG. 1c) shows the integration of the client proxy means and the client means, e.g. in the same computer system so that the communication between the client means and the client proxy means no longer takes place via a network but instead locally within a computer system. FIG. 1d) also shows an advantageous embodiment with which the client proxy means and the server proxy means are not separated by a communications network but instead are integrated, e.g. within a computer system. This integration may be implemented in the same computer system, within one process or as separate processes. FIG. 1e), finally, presents a constellation which includes not only the client proxy means and the server proxy means in the communication path between the client means and the server means but also additional proxy means (e.g. web proxies or web caches). Of these additional proxy means, none, one, or several ones may be provided between the client means and the client proxy means and/or between the server proxy means and the server means. This constellation, including the additional proxy means, may also be configured as illustrated in FIG. 1c) or 1d).

1. Conditional Requests (i) Client means (e.g. web browsers) often direct conditional requests to a server means (e.g. web server), so-called "conditional GET" requests. In such a case the client means does not wish to get the requested object (file/subfile, e.g. x0) unless a certain condition is fulfilled which is specified in the request.

The most common condition is dependence on the last date of a change of an object ("If-Modified-Since"). The client means specifies the condition that the object be transmitted in the reply only if it was modified after a specific point in time T (indicated in the request) (in such a case the client means usually has a copy of the object, dated T, in its internal cache).

A server means replies to these conditional requests either simply by status information (e.g. that the object did not change since the time indicated) or by the full object (if the object did change since the time indicated). The latter may be supplemented by status information.

(ii) If the only reply to a conditional request is status information the client means (browser) will use the copy of the object (e.g. x0) from the local cache and analyze it. If, in doing that, it comes across embedded objects (subfiles x1, . . . , x8) the client means, as a rule, also will express a conditional request for the individual subfiles (x1, . . . , x8), the condition either being the same, a similar, or a totally different condition.

It takes a lot of time (many round trip times, RTT) to transmit all these inquiries via a network having a high transmission time so that the user must wait very long before the structured dataset he/she requested will be available (e.g. full display of the web page asked for).

When applying a method according to DE 100 39 901, with a client proxy means and a server proxy means, the server means potentially may not be able to fulfill its task, namely to analyze file x0 and subsequently pretransmit subfiles contained in it. This is so because the server proxy means would forward the "conditional request" more or less unmodified to the server means, in other words as another "conditional request".

If the condition is not fulfilled the reply from the server means potentially will contain nothing but status information ("the object did not change since . . . "), rather than the contents of file x0 itself. The server proxy means cannot derive the existence and/or the names and/or further information on subfiles from the status information alone. For this reason, the server proxy means according to DE 100 39 901 can do nothing but pass on the status information; it cannot perform its accelerating function. It would have to wait for subsequent receipt of (conditional) requests for the individual subfiles from the client means via the client proxy means (after the client means analyzed the object present in the local cache), and it would forward the same piece by piece to the server means. From the server means, again, potentially it would receive only status information which it merely can forward individually as status information to the client proxy means, the latter being in a position to pass on the status information to the client means.

Thus the state of the art according to publication DE 100 39 901 is insufficient for performing efficient communication in the event of conditional requests (which are widely used on the Internet).

(iii) Therefore, the following method is carried out in the client proxy means and/or the server proxy means:

a) The client proxy means receives a conditional request (e.g. for a file x0) and forwards it unaltered to the server proxy means.

b) Thereupon the server proxy means, instead of sending a conditional request, directs a normal (unconditional) request (e.g. for file x0) to the server means and, in return, it receives not only status information but instead the complete file/object.

Alternatively, the server proxy means may send a conditional as well as a normal (unconditional) request to the server means. This may be of advantage among others because in this way it may forward the answer to its conditional request (potentially faster) to the client proxy means and yet receive the full file/object (x0) in response to the normal (unconditional) request. In this event the server means can pass on to the client means the replies to the conditional requests, in step d), without an independent evaluation of the condition.

Alternatively,—this applies to any occurrence of a conditional request converted into a normal (unconditional) request—instead of not indicating any condition at all, the condition indicated may be modified adequately. Thus a conditional request is replaced by another conditional request whose condition is modified. An unconditional request, therefore, presents itself as a special case of this general form of request. However, to simplify matters, it will always be a normal (unconditional) request which will be mentioned in this context in the specification below, and it will be representative also of a request with modified condition.

c) The server proxy means determines the subfiles (e.g. x1, . . . , x8) contained in the file (x0) it received, and it also sends a conditional or unconditional request for the same to the server means.

The server proxy means directs an unconditional request for a subfile xi to the server means especially if, for instance, the type of subfile xi indicates that xi contains a structured dataset which in turn might include references to further subfiles. That may be so particularly if xi is an HTML file; but it may be useful also for other types of files. If it follows from the type of subfile xi that xi does not include a structured dataset with potential references to other subfiles the server proxy means may desist from expressing a normal (unconditional) request and instead direct only the conditional request of the client means to the server means. Examples of subfiles which presumably do not contain additional subfiles are pictures and audio files. The above steps may be continued recursively as regards the subfiles received in the proxy server means.

The server proxy means makes the assumption that the client means or the client proxy means likewise will express conditional requests for the subfiles (with the same condition).

d) In parallel with c), the server proxy means forwards the files it received to the client proxy means. In doing so, however, whenever possible, it converts the replies back into status information corresponding to the originally received "conditional" requests (among others so as to save transmitting capacity). This means that the server proxy means may pass on the complete files only if the condition of the request is satisfied. That may make it necessary for the server proxy means itself to evaluate the condition which otherwise the server means would have done.

In addition (besides the files) the server proxy means may forward further information to the client proxy means. Such further information may comprise information relating to the conditions of the conditional request (requests of step b) and/or step c)) and/or the corresponding replies from the server means and/or information on the evaluation(s) of the condition made by the server proxy means in step d).

The forwarding of this "condition" information may be accomplished in various ways. For example, the "condition" information may be transmitted as a statement of or by including the request header and/or the reply/response header, as a hash total across the header, as an excerpt from the header, or as a hash total across an excerpt from the header, and/or as a statement of the explicit individual criteria of the "condition" information and/or some of these individual criteria, or a hash total across all or parts of the individual criteria.

e) The client proxy means forwards the data to the client means in accordance with the incoming inquiries. Additionally, it may check whether the assumption(s) made by the server proxy means was correct (for example, that the subfiles are requested with a similar/the same condition) and, if desired, it may send explicit new requests to the server proxy means. Such checking need not be done for all requests because, with the customary client means (web browsers), very often agreement will be found.

Figure 5:
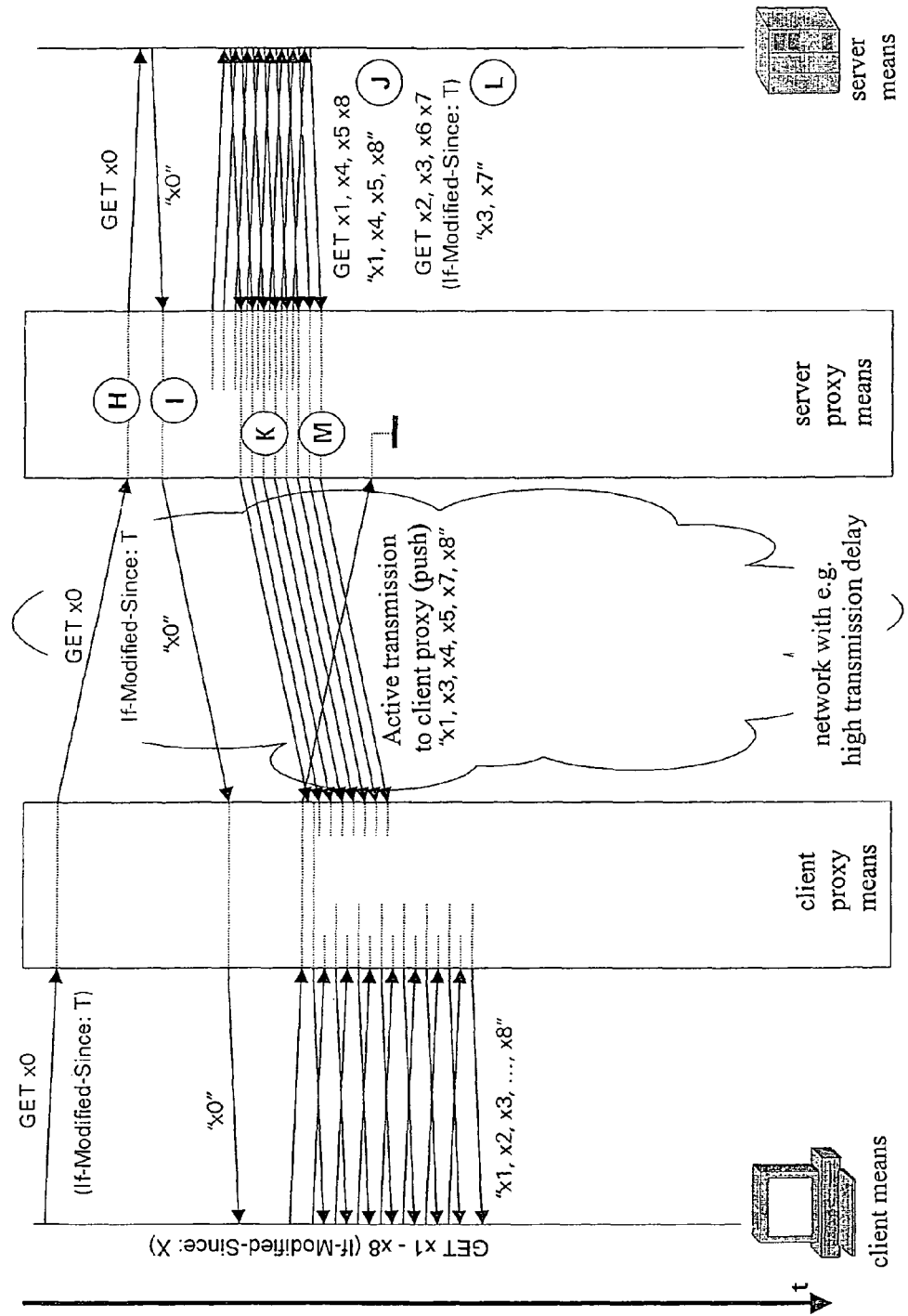
FIG. 5 is a diagrammatic presentation to explain a method of data transmission between a client means and a server means in accordance with the invention.

An embodiment of the method is illustrated in FIG. 5. The client means sends a conditional request for a base file x0 ("GET x0, If-Modified-Since:T") through the client proxy means to the server proxy means where the conditional request is converted (H) into a normal (unconditional) request and passed on to the server means. The answer of the server means are the contents of the base file x0 ("x0") which in this embodiment is passed directly to the client proxy means and thence to the client means. In parallel with the forwarding, the contents of the base file x0 received are analyzed (I) in the server proxy means. In the embodiment shown, eight objects (subfiles) x1, . . . , x8 are found. Let us assume that objects x2, x3, x6, x7 are pictures, while objects x1, x4, x5, x8 are HTML files. As the HTML files x1, x4, x5, x8 potentially may contain further references they, too, are requested (J) by the server proxy means by normal (unconditional) requests. The server means will return the corresponding objects (subfiles) which then are passed on from the server proxy means to the client proxy means and searched (K) for further subfiles in the server proxy means. In the embodiment shown, no references to additional subfiles are found. In view of the fact that the picture objects x2, x3, x6, x7 cannot contain references to further subfiles the server means sends (L) conditional requests (here using the same date T in the condition "If-Modified-Since:T"). In the example chosen, only objects x3 and x7 have changed so that these are the only objects to be transmitted (M) from the server means to the server proxy means and thence to the client proxy means. As regards the unmodified objects x2 and x6, only the respective status information is passed on from the server means through the server proxy means to the client proxy means. Buffering of the objects received from the server proxy means and answering further requests from the client means by way of the client proxy means are performed, for instance, as described above with respect to publication DE 100 39 901.

(iv) The alternatives discussed below may be provided with the method described above for further development thereof:

Refining Step c)

In the case of files of which it may be assumed that they do not contain any subfiles themselves (such as pictures) the server proxy means does not convert the conditional requests into normal (unconditional) requests since the contents of these files presumably would not reveal any further information relevant for pretransmission.

Refining Step d)

When a client proxy means or a server proxy means sends a normal (unconditional) request for a (sub)file to a server means it will receive not only the file from the server means but optionally also a last modification date, as part of the answer. It may be convenient for the client proxy means and/or the server proxy means to supplement a modification date which is missing in the reply by a modification date generated by the proxy means itself and/or to replace a given modification date contained in the reply by a modification date generated by the proxy means itself. This self-generated modification date, for example, may be the current date either of the client proxy means, the server proxy means, or the server means (the client proxy means or the server proxy means may have come to know the latter, for instance, from other parameters of the reply to a request). This may be convenient since the server proxy means, in step d), compares the conditions for the subfiles received, for example, with the last modification date from the request for the base file.

The example given below will make it easier to appreciate the advantages of the aspect described above of the invention.

A file a.html contains an image a.gif as a subfile. File a.html was modified for the last time in the server means on 1.1.2002, the image a.gif was last modified on 1.2.2002.

On 10.2.2002 file a.html is requested by the client means (including, of course, subfile a.gif). Both files are stored in the internal cache of the client means.

On 1.3.2002 file a.html is modified in the server means. At some point in time after 1.3.2002 the same client means once again requests file a.html, indicating the condition "If-Modified-Since: 1.1.2002"—in accordance with file a.html in the internal cache.

The server proxy means determines that file a.html has changed since 1.1.2002 and transmits the file once more to the client means. Having analyzed file a.html, the server proxy means expresses a request for subfile a.gif, likewise using the condition "If-Modified-Since: 1.1.2002" (a conditional request is used because it is assumed that the picture does not contain any references to further subfiles). In response, the server proxy means receives the subfile of the picture (because it was last modified on 1.2.2002, which means after 1.1.2002) and, unnecessarily, forwards it to the client proxy means.

If, on the other hand, the server proxy means, when making its request on 10.2.2002, had used the current date as the date of the last modification for all or some of the (sub)files transmitted (here: a.gif) the whole unnecessary data transfer would have been avoided.

Instead of inserting a modification date generated by itself, the server proxy means might also insert the last modification date that applies, for instance, to an object or a (sub)file of this structured dataset (e.g. web page). Or the server proxy means may use another date that differs from the current date. The corresponding modifications may be carried out by the client proxy means as well or additionally—in coordination with the server proxy means or without such coordination.

Provision may be made for the server proxy means to change the last modification date communicated to the client proxy means (or communicated by the latter to the client means) for specific requests only. Such changing may be dispensed with, for example, with requests not leading to requests for large data-sets or leading merely to requests for header information (the latter, for example, by an HTTP HEAD request). A decision to change the last modification date forwarded also may be made dependent on whether such a change might result in problems, such as when processing future requests. This may be the case with certain server means and/or certain types of files/objects.

Alternatively, provision may be made for the change of the last modification date to be effected not (only) by the server proxy means in passing on information to the client proxy means but, instead or additionally, only when a conditional request is received later by the client proxy means and/or the server proxy means. This has the advantage that always/often the correct modification times for files/objects will be transmitted to the client means. Under these circumstances, the client proxy means or the server proxy means, in general, would receive a conditional request containing the last unchanged modification date, known to the client means, when the file is requested again later, for example by the user of the client means (e.g. by "reload" in the web browser). Based on memorized information regarding previous requests from this client means or this client proxy means (such as the date of the last transmission of the files/subfiles now asked for) the client proxy means or the server proxy means can decide what the otherwise changed modification date would have looked like.

Alternatively, the server proxy means or the client proxy means also may forward information for alternative methods as a separate header field, as cookie information, or information in another form instead of or in addition to the field normally used for the modification date, and they may do so in addition to or instead of changing the last modification date, possibly modified, which is forwarded together with files/objects in the direction of the client means (in other words from the server proxy means to the client proxy means and/or from the client proxy means to the client means).

The known HTTP cookies thus are just an example of cookies and cookie information. A known HTTP cookie has a name, a value, and a scope/realm of application; other cookies may have any other structure desired, or may not have an internal structure, as far as can be seen. The expressions cookie and cookie information generally, in the broadest sense, are understood as being any desired supplementary information transmitted additionally in suitable manner. They include HTTP cookies merely as a special case. If information is to be transmitted as cookie information that may be done either by using an existing cookie and/or introducing an additional cookie by the server proxy means or the client proxy means. When an existing cookie is chosen the supplemented information, for example, may be incorporated in addition in the value of the chosen cookie (separated by a delimiting character, for instance).

Alternatively, it may be the client proxy means which changes (step e) the last modification date forwarded. The server proxy means, for instance, may send the correct date or no date or a recommended date to the client means and/or the client proxy means.

In an alternative embodiment it is provided that, in responding to (conditional) requests received from the client means or the client proxy means, the server proxy means will supply the client proxy means, always or at least in part, not only with status information (without or with only parts of the file(s) requested) when that would be possible, but instead will pass on to the client proxy means the whole file that was asked for. Admittedly, this increases the data volume transmitted between the server proxy means and the client proxy means, but still (due to the prefetching enabled on the part of the server proxy means) it is much faster normally than without prefetching. The decision whether a conversion into status information for forwarding to the client proxy means shall take place may be a fixed setting (always/never) and/or it may depend on one or more parameters. Examples of such parameters, among others, may be the size of the file to be sent or the transmission bandwidth available. These parameters may be set manually and/or automatically by the user of the client means and/or the client proxy means and/or the operator of the server proxy means and/or network management. The settings are transmitted in suitable manner to the proxy server means. The decision also may be taken directly by any one of the parties mentioned and then transmitted to the server proxy means.

In another alternative embodiment the client proxy means and/or the server proxy means respond to time-conditioned requests ("If-Modified-Since") out of their own initiative (i.e. without forwarding the request to the server means) by sending self-generated status information (such as "unmodified" if the point in time indicated is in the past by not more than a certain period, either predetermined or determined dynamically).

In another alternative modification, the procedure is same as described in steps a) to e). However, in step b), the server proxy means does not filter out the condition stated in a request for a base file, in other words, it passes on a conditional request as it is to the server means. As a consequence, in step c), the server proxy means will not analyze the answer it received unless, indeed, a file was returned by the server means rather than merely status information. Following that, the server proxy means expresses requests for the subfiles found (taking over or not the condition from the request for the base file—the take-over providing potentially better results) and continues to proceed as described above.

2. Personalized Web Pages (Cookies/Log-In)

(i) The number of web pages attempting to find out the identity of the requestor is growing constantly. The reason for this determination sometimes is only to draft profiles of the individual users, to count the number of users, or to return really personal/personalized web pages. Such really personalized web pages among others are web pages by means of which a user can read and manage his personal e-mail. Or web pages which will enable to get some other protected information which is meant to be accessible to certain persons only.

In technical terms, this requesting of personal web pages is implemented by supplements included in the requests (GET). As a rule, the client means (e.g. the web browser) does not know at first that it is meant to send along also a registration/personal information in the request. Therefore, the client means first (at first access) expresses the request without sending the personal information along in the request. In return, the server means thus frequently asks for a user registration (to indicate personal information in the requests), or it sets a value within the reply (in addition to the file supplied), upon the first access, for personal identification of the user and subsequent accesses.

Nowadays, on the internet this user information mainly is realized by so-called cookies.

An alternative method, for instance, is the normal HTTP authentication, including a user name and a password. This can be applied in a manner similar to a cookie (and, among others, may contain a scope of validity/realm/domain/path which is in part defined or depends on an URL describing the requested base file, or the "value" may be replaced by a password).

Also, there are methods, like the genuine HTTP cookies, where the values often are predetermined by the server means, whereas, with normal HTTP authentication or registration, the server means requests the client means or the user to enter the respective values (such as user name and password).

The terms cookie and cookie information, therefore, will now be used also as generic terms for these alternative methods or the information exchanged by this alternative method. A cookie in this context has a name, a value, and a realm/scope of validity. The realm/scope of validity is divided into a so-called domain and a path. The domain indicates the computers (often equivalent with server means) for which this cookie is to be valid. A domain "tellique.de", for example, is used if the respective cookie is to be sent along for all the computers under tellique.de, such as www.tellique.de. The path indicates the objects (e.g. web pages) in the respective server means/computers for which this cookie is to be sent along in requests. For example, the cookie may be applicable only to all those files of a server means whose file names begin with "/private" or "/mail".

A client means will send along the respective cookies with all requests for files if the respective file names (URLs) contain the domain and the path of a cookie. The server means responds by the corresponding personalized file contents, or it simply counts how many times a certain user has looked at a web page, based on the cookie information.

(ii) For prefetching, a server proxy means must know whether or not to incorporate cookie information in the requests for subfiles. To that end, however, the server proxy means must decide for which requests for subfiles to include which cookie information in the requests directed to the server means. The server proxy means, in general, comes to know the names and values of a cookie from requests for the base file. That is where the client means places the name and the value of the cookie but not the domain nor the path of the cookie.

The domain and path of a cookie are determined by the server means (or by whoever generated/stored the files there). When a client means sends a request in which a cookie that is needed is not set, the server means mostly replies by sending the file content (or an empty/special file content), however, it also sends along a SET cookie command containing the cookie name and its value, the domain and the path. The client means stores this information and uses it internally for later decisions on which requests to forward with this cookie incorporated in them. A server proxy means, however, normally would not know the domain and path information.

The term "cookie" will be used generally below, but it simply stands for personal information when requesting a personalized web page.

(iii) An Embodiment thus takes the following course:

a) client means sends a request for a base file, including the statement of a cookie.

b) The client proxy means forwards the request including the cookie to the server proxy means.

c) The server proxy means sends a request including a cookie to the server means.

d) The server means answers by sending the content of the base file.

e) The server proxy means analyzes the base file received (recursively later subfiles) and determines the names of the subfiles it contains.

f) The server proxy means makes an assumption if or which cookies are to be included in the requests for each individual subfile. In the simplest case (simplest method), it incorporates in the requests for the subfiles the cookie information which was set for the base file request.

g) From the replies, the server proxy means determines whether it expressed a correct request (including the necessary cookie information). It cannot necessarily be sure about this determination. If, however, it believes that all the necessary cookie information was included, it forwards the subfile received to the client proxy means. In doing that, it also forwards to the client proxy the information as to how or with which cookies the request was directed to the server means, if desired, in full or abbreviated version, for instance as a hash total across the request sent or the relevant parts of the request.

h) The subfiles received may be analyzed recursively for further subfiles contained in them, and the corresponding procedure will follow.

i) The client proxy receives the files, and buffers them for some time.

j) When requests come in from the client means, the client proxy means checks whether it already received a corresponding file. Optionally, the client proxy means further checks whether the request it just received from the client means conforms, in the relevant parts thereof, with the request which the server proxy means had used as the request for this subfile directed to the server means (from which it follows whether the right contents of the subfile were supplied by the server means and passed on from the server proxy means to the client proxy means). Depending on the check, the client proxy means forwards the previously buffered file to the client means or sends a suitable new request (with the right cookie information) via the server proxy means to the server means.

The assumption in step f), for example, may be:

(1) The same cookie(s) used in the request for the base file shall be used in requests for a subfile.

(2) In the event the server proxy means is informed by the server means in reply to a request for a file that a certain cookie was missing (SET cookie in the answer), this server proxy means, at first, will use this additional cookie in requests for subfiles which were found by the analysis of this file.

The server proxy means may repeat the request for the file, using in addition the cookie contained in the "SET cookie command" of the reply. However, this should not be necessary with the present common utilization of cookies on the internet.

The server proxy means may make assumptions regarding the domain and the path of the cookie. For instance, it may assume that the path always is "/" (meaning that it comprises all the objects of the respective server means) and that the domain is part of the DNS computer name (for instance, assuming the domain to be "cnn.com" if a cookie is contained in a request for a URL on the server means "www.cnn.com").

(3) The server proxy means can remember permanently or temporarily (caching) the realms/scopes of validity of cookies (name, perhaps value, domain, path—or at least part of these data) per request chain (i.e. requests for a base file including the subfiles), per client means, or even cross-client means. Thus it can decide independently whether to send along a certain cookie when requesting a subfile. The server proxy means also can decide whether it makes sense at all to request a subfile, given the (potentially insufficient) information, if it does not know the value of this cookie.

The server proxy means can read this information from the requests themselves (cookie name, value), from answers given by the server means ("SET cookie", including domain, path). Instead or in addition, the server proxy means can try to learn the domain/path correctly from the requests alone, in other words to memorize for which computers/paths this cookie was sent along so far in requests by browsers, thus relatively safely making an assumption as to the domain/path.

Provision may be made also for establishing a cache with cookie information, such as domain, path, value, etc. in the client proxy means instead of or in addition to the server proxy means. In its requests to the server proxy means, the client proxy means thus will be able supply the necessary information out of its own cache as additional information in the request to the server proxy means.

(4) If the server proxy means does not know the scope of application of a cookie it can send a test request relating to the respective subfile(s) to the server means without any indication of the cookie because, in the answer, the server means will inform the server proxy means through a "SET cookie command" among others of the domain and path of this cookie.

If the server proxy means determines that one/several cookies must be sent along with this request and it likewise knows the value of the respective user (from its own cache or from the request for the base file) the server proxy means can request the subfile once more, correctly, with the correct cookies.

Alternatively, the server proxy means may send to the server means a so-called HTTP HEAD request as a test request. Also in that event it will be informed of the cookies that are needed and which domains/paths these cookies have. But in reply the server means, at first, will not send along the file. Hereby, the unnecessarily transmitted data volume is reduced.

(5) There are files (e.g. web pages) for which the cookie information need not be correct. Essentially, on the present day internet according to HTTP standard that is true of web pages for which caching is allowed. The answer/header given by the server means reveals to the means involved whether or not caching of a file is allowed. Therefore, a server proxy means, alternatively, simply may not include cookie information for the subfiles in the requests, but utilize the replies when caching is permissible.

(iv) In steps g) and j), the server proxy means and the client proxy means, when making their comparisons, can take into account that there are files with which it is not required that the cookie information used in the requests be correct. At present, these are files for which caching is allowed for normal web caches. Therefore, false cookie information used in the requests may be ignored in g) and j) for such files.

It may also be provided to switch the system into the "ignore" mode with which "cookie" mismatches (in other words too many/too few cookies contained in the requests) are simply ignored. Such a mode is a convenient embodiment because it permits more efficient access to "non-personalized" web pages.

The mode either may be given statically or adjusted dynamically by the user and/or the client proxy means and/or the server proxy means and/or a network management component. Also, areas of the Internet for which this "ignore" mode may be employed can be described by the user and/or in the client means and/or in the client proxy means and/or in the server proxy means (for example, by naming lists of complete or partly quoted URLs/addresses of server means, domain names, and/or file names).

In addition to j) and previously g), it may be provided that the client proxy means compares whether the files received in advance from the server proxy means have been requested from the server means using the correct parameters in the request (e.g. cookies). This makes sense, especially with the "personal-web pages"/cookies. But it is advantageous also irrespective thereof because part of the request can designate the type of client means (optionally). If desired, a server means, therefore, can supply different file contents depending on whether the request came from a Microsoft Internet Explorer, a Netscape Browser, or yet another web browser.

As potentially more end users/client means are making use of the same client proxy means, it may make sense to check in this step j) whether the objects available to him were not returned specifically for another client means (e.g. use of a different web browser-specific formatting of the web pages).

3. Script Evaluation (i) Web pages, by now, frequently contain small programs which are executed by the client means (e.g. the web browser), or are executed externally on the same PC upon receipt by the client means. These programs, for instance, are Java scripts which are given to the client means as individual files or as a subcomponent of a file.

(ii) These scripts often contain commands for loading additional files/objects through the client means. For example, they contain statements that additional images (=subfiles) should be loaded and displayed. However, actually carrying out these scripts in the server proxy is very difficult/hardly possible, among others, because potentially this leads to a high CPU load, requires interpretation capabilities for the various script/programming languages, often requires certain rights or system environments, and because a risk exists that the server proxy means may become damaged or impaired by evil scripts.

(iii) The scripts are analyzed by the server proxy means, and references to subfiles contained in them are "guessed". Such an analysis, for instance, includes going through the script/program text with the assumption that parts of the text beginning with "http://", being available in the "a.b.c" form (such as www.cnn.com), i.e. beginning like a DNS computer name, or ending in a specific way (e.g. ".gif", ".htm", ".html", or ".jpg") each are a reference to subfiles.

The server proxy means still may supplement the file names it guessed. For example, it may do so in such a manner that the computer address/path of the script just analyzed will precede the name determined of the subfile.

Subsequently, the server proxy means tries to request these subfiles from the respective server means. If it receives a correct file in response to the requests it forwards the same to the client proxy means. If it receives an error message it may assume, as a way of optimizing the process, that it just has a false file name, and nothing will be passed on to the client proxy means. Alternatively, the server proxy means can try to execute the script. That can be done either by direct internal support of the script language or externally of the server proxy means, for instance, by a browser means to which the script is passed for execution.

The server proxy means subsequently is informed by suitable measures which additional files were requested by the external application (browser) when executing the script. This is possible, for example, by passing all requests for files from the external application first through an analysis tool which potentially is implemented within the server proxy means. (To this end, for example, a respective proxy means, e.g. the server proxy means itself, is configured in the externally started browser so that requests for subfiles are not sent directly to the server means.)

(iv) As it is quite well possible that false file names are the result of the analysis/guessing of the subfile names—and/or files which are not needed at once but only, for example, after a request has been made by a user (clicking on the link)—it can be adjusted that only subfiles up to a certain size will be requested in order to limit the risk for unnecessarily transmitted data.

Another expansion that can be implemented is to transmit also large "guessed" files/file names and to cut off the transmission unless an explicit request was received from the client means. In this case, the transmission first is taken up even for very large files, but it is interrupted after a preadjustable period of time if no corresponding request was received.

4. Compressed Objects (i)/(ii) For analyzing files as to subfiles, a method or a server proxy means according to DE 100 39 901 A1 would have to decompress the files if they are transmitted in compressed form from the server means. Client means can permit server means to send them the objects/files in compressed form.

(iii) Two approaches to a solution are possible, and they may be employed individually or in combination:

(1) The server proxy means (and/or the client proxy means) converts the requests such that the answers no longer can/must be supplied in compressed form. (In the HTTP protocol, at present, a statement is provided in a header field of a GET request to permit the transfer of compressed files from the server means. It does not cost much to filter out this permission.)

(2) The server proxy means decompresses the file for the analysis as to subfiles and then either forwards to the client proxy means the uncompressed files or (better still) the files which still/again are compressed.

5. Unallowed and Allowed Caching in the Client Proxy (i) There are files/objects for which no caching whatsoever is allowed. Usually the information whether or not caching is allowed is passed along by the server means upon a request in the header to the answer (together with the file).

(ii) The client proxy means must perform caching, i.e. buffer for a short time those files it was sent from the server proxy means "without having been requested" because otherwise it would not be able to wait for the receipt of a corresponding request from the client means matching the file that was sent from the server proxy means unasked for. Moreover, short term buffering of files makes sense even if caching actually is not allowed for them because some client means make repeated requests for them, e.g. if they occur several times on the same web page. Examples, among others, are small pictures.

However, this may be problematic in that, despite a new request from the client proxy means, a client means may be given an obsolete version due to the buffering of files which actually were not allowed for caching, e.g. because their contents change very rapidly.

(iii) The following is suggested: (1) In the basic version, a client proxy means buffers also those objects for which caching was not really allowed in order to use the files received from the server proxy means for answering the requests coming in a little later from the client means. Yet this is nothing but short-term caching.

(iv) (2) In addition, after (1), a client proxy means may restrict itself to forwarding an object actually not allowed for caching no more than once to a client means (thereby avoiding the risk of passing on an obsolete version in case of a new request).

(3) It may be advantageous for a client proxy means, after (1) and (2), to forward a buffered file several times to the client means in the event that this file is requested continuously again and again (e.g. at least once per 200 milliseconds) because then potentially these are multiple requests simply because there are multiple appearances of this file/object on a web page. The respective time interval may be adjustable in fixed and/or dynamic fashion, manually and/or automatically by users and/or an operator and/or network management.

(4) If caching is allowed the client proxy means may buffer the files for a longer period of time in order thereby to reduce the question and answer data volume and to quickly provide the objects locally.

(5) A server proxy means may get information from a client proxy means indicating which files still are buffered in the client proxy means. The server proxy means may use this information to suppress requesting/forwarding of subfiles as long as they still are available in the cache of the client proxy means, regardless of whether caching of these files actually is allowed or not.

(6) In addition to (5), instead of and/or in addition to the information supplied by the client proxy means about buffered files/objects, a server proxy means itself may calculate which files/objects still are contained in the cache of the client proxy means (e.g. due to knowledge of the algorithms in the client proxy means and the selected parameters), thus determining whether a certain file still ought to be in the cache (and consequently need not be transmitted).

6. Subfile Coming in Slowly/Later (i) Many server means are slow—often the network connections to the server means are slow, or relatively great files are requested—so that it takes long to transmit these files either from the server means to the server proxy means and/or from the server proxy means to the client proxy means.

(ii) Analyzing of the base file/subfiles should be started as soon as it starts coming in piece by piece from the server proxy means so that requests for the subfiles can be begun as soon as possible. Often the client means sends a request for a subfile while the latter has arrived only partly at the client proxy means. It happens frequently that the client means sends a request for a subfile before anything of this subfile has come in at the client proxy means.

(iii) A client proxy means starts answering an incoming request from a client means by first data just arriving of a subfile, and supplements the reply by the data of this subfile coming in subsequently. The ways of proceeding may be as follows:

(1) A client proxy means, not being able at first to find a subfile that is available or coming in from the server proxy means, and fitting, at first passes on the request to the server proxy means. But the client proxy means interrupts this request if this subfile arrives in parallel from the server proxy means. (This is so, for instance, if the sending of the file from the server proxy means and of the request from the client proxy means intersect on the network, e.g. at high transmission delay.)

(2) Furthermore, it may be provided that the server proxy means—if it understands the behavior of a client proxy means according to (1)—will subsequently ignore the request which thus was transmitted uselessly.

(3) It may be provided that a server proxy means receiving a request from a client proxy means recognizes that the request for the same file (potentially additionally checked with the same request parameters for the same client proxy means) already has caused a request to the server means for which, however, the server proxy means has not yet received any or just a few data. In this event, the server proxy means can associate this request from the client proxy means with the request already expressed and forward to the client proxy means the data received in response to the request already expressed.

7. Prioritizing the Objects to be Sent (i) The server proxy means passes on to client proxy means both the base files requested directly by any client proxy means and the subfiles received through prefetching. Potentially, the files (base files and subfiles) to be forwarded compete for the network bandwidth available between the server proxy means and the one or more client proxy means. That is true when looking at only one client proxy means and one server proxy means individually and also when one server proxy means exchanges data with a plurality of client proxy means, all the more so as perhaps only one network bandwidth commonly used by all client proxy means may be available for data exchange with all the client proxy means.

(ii) The client means often benefits if it receives the base file actually requested as quickly as possible. With many web pages in connection with some web browsers the result is that these objects or the general structure of the page is displayed to begin with. Under these circumstances, the web page, in general, is not yet complete (text, pictures, if any, perhaps may be missing) but the user frequently may begin at least partly to look at the web page.

(iii) The server proxy means prioritizes in forwarding the base file received or the subfiles to the one or more client proxy means, assigning a higher priority in one form or another to the base files.

(iv) Alternatively, the server proxy means may prioritize the base files by sending the base files first as long as there are base files outstanding for transmission. Alternatively, the server proxy means also may utilize a relatively or absolutely larger proportion of the bandwidth for transmitting base files if they are waiting to be transmitted, in other words not completely halting or pausing in the transmission of subfiles.

8. Server Proxy Means Utilizes Special IP Address(es)

(i) The server proxy means exchanges requests and data with the server means. This exchange of data is initiated (by the initial request) by the client means or forwarded by the client proxy means, respectively. Yet the server proxy means is positioned between the server means and the client proxy means or the client means, respectively.

Depending on the concrete technical implementation, it might be that, for communication with the server means, the server proxy means uses its own network address, e.g. its own IP (=Internet Protocol) address. In this case, as a rule, it would not be possible, particularly for network components between the server proxy means and the server means, to recognize with standard procedures which client proxy means or even which client means caused this exchange of data. In part (depending on higher layer protocols used above the network level/IP) this would not be recognizable even by the server means.

(ii) Based on the network addresses used (e.g. IP addresses) for the data exchange, it should be recognizable for the network and/or network components between the server proxy means and the server means and potentially also the server means itself which client proxy means or, optionally, which client means caused the data exchange or is taking part in it. That may be advantageous for various reasons, among others (just listed as examples) because telecommunications carriers or service provisioners keep statistics on usage; because components adapted to limit the throughput through individual client means or groups of client means are to be used between the server proxy means and the server means; because it should be or must be possible to provide information as to which client means or even which user initiated a particular exchange of data.

(iii) First, some information on the technical background will be given for a better understanding of the aspect of the invention. Network components (for example, computers and, therefore, potentially also the client means and/or client proxy means) have a network address of their own. This address normally is referred to as network address at layer 3 in the ISO/OSI reference model (e.g. an IP address).

On a computer, however, very diverse applications in part use very many parallel connections for exchanging data. These connections often are distinguished at the transport layer, i.e. on layer 4 of the ISO/OSI reference model (potentially also or only on even higher levels of the ISO/OSI reference model).

The course of things will be described below, by way of example, on the basis of the presently predominant TCP protocol (Transmission Control Protocol), a protocol belonging to the transport layer, i.e. layer 4 of the ISO/OSI reference model. Nevertheless, the description may be mapped on other protocols as well.

TCP allows a computer (which, for instance, has only one network address/IP address) to distinguish a great many parallel connections for data exchange. What is more, TCP can assign them to the right applications. To accomplish that, TCP makes use of another address (so-called port number/ports). What is important here is that the combination of ports for two computers under consideration is unambiguous. In other words two different connections to exchange data between two computers will not use the same port numbers on both sides.

As regards the objective described above in section (ii), first of all, it must be made sure that, for communicating with the server means, for example, the server proxy means uses a network address/IP address of the client means or client proxy means. Yet the server proxy means may not do that unless it can make sure, at the same time, that when doing that it will utilize a port number which will not collide with other connections used for data exchange by the client means or the client proxy means.

That can be resolved rather easily regarding requests for base files. With such requests, (depending on the concrete implementation, but normally) the client means sets up a TCP connection to the client proxy means. Thereupon client proxy means may forward (as one of several procedures conceivable), for instance, the IP address and the TCP port number of this TCP connection received from the client means as information to the server proxy means. For its own request, the server proxy means thus may use the IP address of the client means and this TCP port number of the client means instead of its own IP address.

The operation is much more complicated regarding the additional requests for subfiles executed by the server proxy means through prefetching, "prefetching connections". To begin with, there is no TCP connection of the client means for these prefetching connections so that continued use of a TCP number of the client means is impossible.

Thus, the method below is suggested as well as some alternative further developments.

a) Port numbers are reserved on the client means (i.e. they cannot be used by TCP for any other connections). Information regarding these pre-reserved or dynamically reserved port numbers is configured on the server proxy means and/or communicated dynamically to them. The server proxy means thus can use one of these port numbers for prefetching connections.

b) The same approach as in a) is applied, but the reservation of port numbers is made on the client proxy means.

c) Additional network addresses/IP addresses are used for each client means or client proxy means or also for a group each of client means or client proxy means. They can be configured on the server proxy means, or they are defined on the client means and/or the client proxy means and transmitted to the server proxy means. For prefetching connections, the server proxy means can utilize the respective one of these network addresses/IP addresses and any desired or likewise reserved port numbers for these "substitute" IP addresses.

d) The server proxy means first may complete the request for the base file and then, for some (rather short) time, use the IP address and port number which had been used by the client means for the TCP connection to request the base file. Yet that is possible to a limited extent only because the client means might use these port numbers again, at least after a while, unless precautionary measures are taken.

Figure 4:
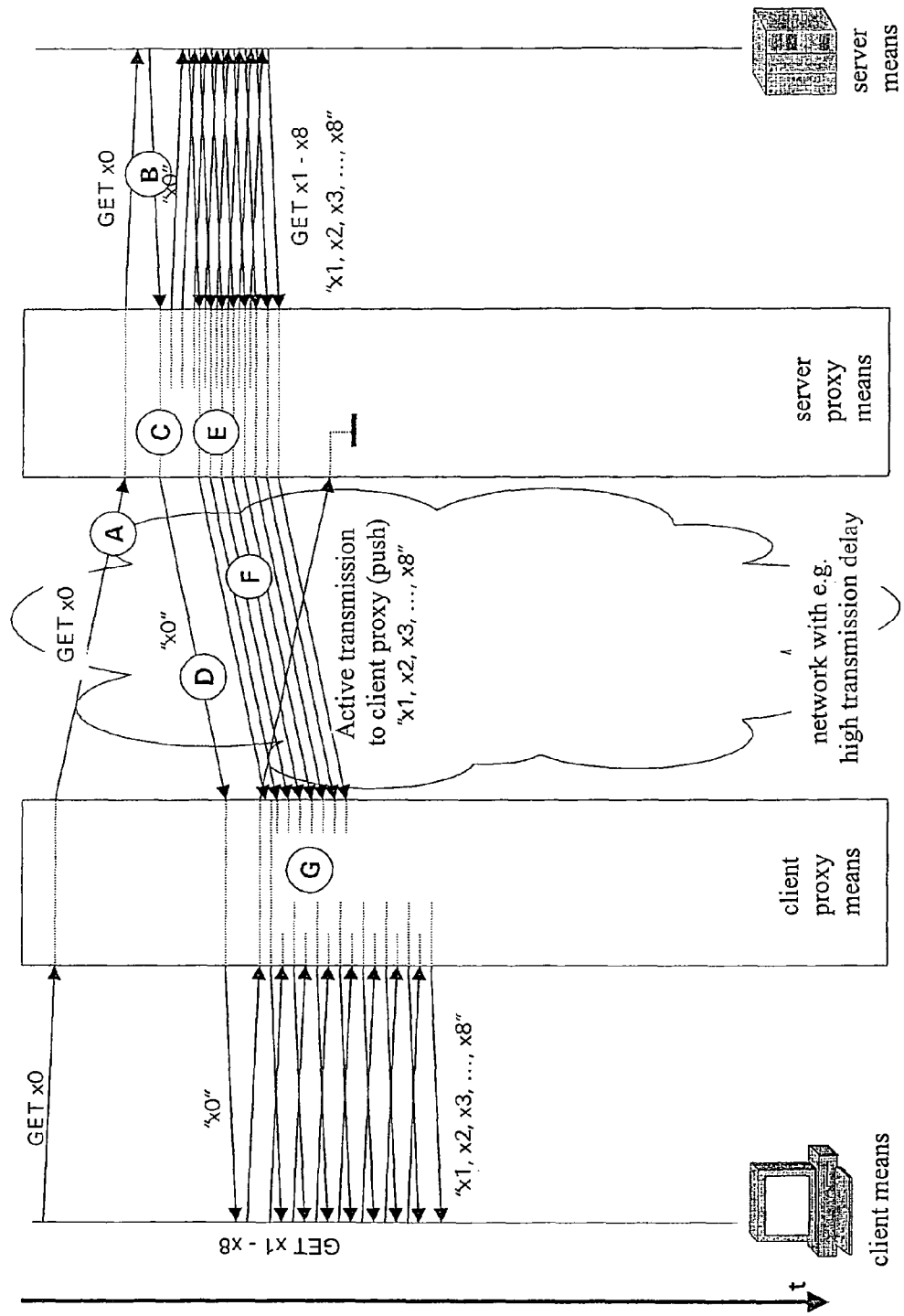
FIG. 4 is a diagrammatic presentation to explain another known method of data transmission between a client means and a server means.

It should be noted that the preforwarding of files by the methods described above may be performed, on the one hand, by individually transmitting individual files (as illustrated in the basic diagram of FIG. 4). But, moreover, other manners of transmission are conceivable and do make sense. For instance, after analyzing a base file and/or its subfiles, first an index file (index page, index list of contents, or the like) containing information on all or some of the subfiles/objects found by the server proxy means may be generated and transmitted from the server proxy means to the client proxy means so that the client proxy means, for instance, already knows which files will be pretransmitted shortly. Alternatively or additionally, it may be provided to transmit the files in one or more bundles rather than individually. The grouping of files in bundles may follow different rules (e.g. size of file, overall size, prioritization, subfiles included, base files, etc.). The sequence at which individual files or file groups are transmitted or their relative or absolute prioritization (such as bandwidth proportion for files or file bundles) may be chosen, among others, according to the requests from the client means and/or the client proxy means and/or the server means and/or the contents transmitted. Also, files may be transmitted compressed and/or encrypted individually or in groups. Further variants are conceivable.

Furthermore, it should be noted that the network having a great transmission time may be representative of any desired network, comprising a DSL, mobile radio communications, radio broadcasting, satellite, wireless local area network, or any desired IP network. No matter which it is, the efficiency enhancing effect of the instant invention when accessing structured datasets always is assured. And it is the greater, the stricter the limitations of the network are, whether it is the long transmission time, small bandwidth, high error rate, etc.

It is to be noted that the methods described above can be used to advantage also when the client proxy means described and the server proxy means described are not separated by a transmission network. Even with fully combined client proxy means and server proxy means, much more rapid transmission of information between the client means and the server means is obtainable. Here, the combined client proxy means and server proxy means could be implemented rather closer to the client means as well as rather closer to the server means (as seen from the network).

It may also be provided to have further components connected in the transmission path between individual components, especially between the client means and the client proxy means as well as between the server proxy means and the server means. Such further components may be, for example, cache proxies (web caches) or so-called forwarding proxies (such as firewalls) which are widely used on the Internet at present. These components, in part, may be configured explicitly in the transmission path (for example, by explicit configuration of a caching proxy in the server proxy means, located between the server proxy means and the server means) or, in part, they may not require explicit configuration (such as the so-called transparent web caches).

The features of the invention disclosed in the specification above, in the claims and drawing may be significant for implementing the invention in its various embodiments, both individually and in any combination.

What is claimed is:

1. A method of transmitting data in a system comprising a server and a client which are interconnected via a plurality of proxies, including a server proxy and a client proxy, comprising the steps of:
    generating a conditional request from the client for a base file of a structured dataset to be fetched via the server in the system, and transmitting the conditional request to one of the plurality of proxies, said step of generating the conditional request comprising a condition;
    deriving a modified request for the base file from the conditional request in the one proxy by changing the condition, the modified request being configured to always retrieve the base file from the server;
    transmitting the modified request for the base file by the one proxy to the server;
    receiving the modified request for the base file and analyzing the modified request in the server;
    transmitting a reply dataset, including the base file, from the server to the one or another one of the plurality of proxies;
    receiving the reply dataset and analyzing the reply dataset by the one or the another one of the plurality of proxies to determine information about a subfile of the base file; and
    generating a request for the subfile of the base file by the one or the another one of the plurality of proxies and transmitting the request for the subfile to the server when information about the subfile is determined by analyzing the base file.

2. The method as claimed in claim 1, further comprising the step of transmitting the subfile by the server to the one or another one of the plurality of proxies, and said step of transmitting a reply dataset includes analyzing information about a further subfile recursively by the one or another one of the plurality of proxies.

3. The method as claimed in claim 1, wherein said step of generating the conditional request includes using the condition comprised by the request for the base file for the request for the subfile.

4. The method as claimed in claim 1, wherein said step of deriving a modified request for the base file includes deriving an unconditional request from the conditional request.

5. The method as claimed in claim 1, wherein said step of transmitting a reply dataset includes transmitting status data together with the reply dataset from the server to the one or another one of the plurality of proxies.

6. The method as claimed in claim 5, wherein said step of receiving the reply dataset includes evaluating the condition of the request for the base file in the one or another one of the plurality of proxies receiving the reply dataset from the server and, depending on the result of this evaluation, forwarding the reply dataset received and/or the status data to another one of the plurality of proxies or the client.

7. The method as claimed in claim 5, wherein said step of receiving the reply dataset includes evaluating the condition of the request for the base file in the one or another one of the plurality of proxies receiving the reply dataset from the server and forwarding the reply dataset received and/or the status data to another one of the plurality of proxies or the client when the evaluation of the condition shows that forwarding of the reply dataset is not necessary.

8. The method as claimed in claim 5, wherein said step of receiving the reply dataset includes evaluating the condition of the request for the base file in the one or another one of the plurality of proxies receiving the reply dataset from the server and, depending on the result of this evaluation, forwarding the reply dataset received and/or the status data to another one of the plurality of proxies or the client, and said step forwarding the reply dataset includes annexing status data to the reply dataset and/or the status data and/or replacing at least parts of the status data by status data in the one or another one of the plurality of proxies, when forwarding to another one of the plurality of proxies or the client.

9. The method as claimed in claim 5, wherein said step of receiving the reply dataset includes evaluating the condition of the request for the base file in the one or another one of the plurality of proxies receiving the reply dataset from the server and, depending on the result of this evaluation, forwarding the reply dataset received and/or the status data to another one of the plurality of proxies or the client;
    said step of forwarding the reply dataset includes annexing status data to the reply dataset and/or the status data and/or replacing at least parts of the status data by status data in the one or another one of the plurality of proxies, when forwarding to the other one of the plurality of proxies or the client; and
    the status data annexed by said step of annexing or the status data replaced by said step of replacing in the one or another one of the plurality of proxies reveal to another one of the plurality of proxies or the client how the one or another one of the plurality of proxies evaluated the condition in said step of evaluating.

10. The method as claimed in claim 5, wherein said step of receiving the reply dataset includes evaluating the condition of the request for the base file in the one or another one of plurality of proxies receiving the reply dataset from the server and, depending on the result of this evaluation, forwarding the reply dataset received and/or the status data to another one of the plurality of proxies or the client;
    said step of forwarding the reply dataset includes annexing status data to the reply dataset and/or the status data and/or replacing at least parts of the status data by status data in the one or another one of the plurality of proxies, when forwarding to another one of the plurality of proxies or the client; and
    said step of annexing or replacing status data includes transmitting the status data supplemented or replaced by the one or another one of the plurality of proxies in the form of a header data record and/or as a component part of a cookie, an excerpt from a header data record and/or a cookie, or a hash sum across a header data record and/or a cookie.

11. The method as claimed in claim 5, wherein said step of receiving the reply dataset includes evaluating the condition of the request for the base file in the one or another one of the plurality of proxies receiving the reply dataset from the server and, depending on the result of this evaluation, forwarding the reply dataset received and/or the status data to another one of the plurality of proxies or the client;

said step of forwarding the reply dataset includes annexing status data of the reply dataset and/or the status data and/or replacing at least parts of the status data by status data of its own in the one or another one of the plurality of proxies, when forwarding to the other one of the plurality of proxies or the client;

said step of annexing or replacing status data includes transmitting the status data supplemented or replaced by the one or another one of the plurality of proxies in the form of a header data record and/or as a component part of a cookie, an excerpt from a header data record and/or a cookie, or a hash sum across a header data record and/or a cookie; and said step of receiving the reply dataset includes checking at one of the plurality of proxies whether the client expresses the request for the subfile with the same or a comparable condition as the one proxy did.

12. The method as claimed in claim 5, wherein said step of transmitting a reply dataset includes forwarding only the status data or only parts of the base file together with the status data in the one or another one of the plurality of proxies when the one or another one of the plurality of proxies, in checking a reply dataset size of the reply dataset, determines that the size of the reply dataset checked exceeds a threshold value size.

13. The method as claimed in claim 12, wherein said step of checking includes using the threshold value size which is user defined.

14. The method as claimed in claim 5, wherein said step of transmitting status data includes forwarding only the status data or only parts of the base file together with the status data in the one or another one of the plurality of proxies when the one or another one of the plurality of proxies, in checking a transmission bandwidth available for transmitting the reply dataset, determines that the transmission bandwidth checked is below a threshold value bandwidth.

15. The method as claimed in claim 14, wherein said step of checking includes using the threshold value bandwidth which is user defined.

16. The method as claimed in claim 1, further comprising the step of transmitting modification information including date and/or version information for the base file or subfile in addition to transmitting the base file or the subfile by the one or another one of the plurality of proxies.

17. The method as claimed in claim 16, wherein said step of transmitting modification information includes transmitting the modification information as a header data record by the one or another one of the plurality of proxies.

18. The method as claimed in claim 16, wherein said step of transmitting modification information includes transmitting the modification information as electronic user or cookie information by the one or another one of the plurality of proxies.

19. The method as claimed in claim 1, further comprising the step of annexing the modification information generated by the one or another one of the plurality of proxies to the reply dataset.

20. The method as claimed in claim 1, wherein said step of receiving the reply dataset includes generating proxy status information in response to the conditional request for the base file in the one proxy and transmitting the proxy status information to the client.

21. The method as claimed in claim 1, further comprising the step of making an assumption regarding the base file and/or the subfile as to whether the base file or subfile comprises another subfile in the server proxy, and deriving the modified request from the conditional request when a made assumption is that the base file or subfile comprises another subfile.

22. The method as claimed in claim 21, wherein said step of using the server proxy includes making the assumption on the basis of the type of file of the base file or subfile.

23. The method as claimed in claim 1, further comprising the step of making an evaluation of the condition in the one or another one of the plurality of proxies and answering the request for the base file itself by suitable status information.

24. The method as claimed in claim 1, further comprising the step of evaluating script information in the base file and/or the subfile in the one or another one of the plurality of proxies.

25. The method as claimed in claim 1, further comprising the step of decompressing the compressed data of the reply data set when the reply data set comprises the compressed data.

26. The method as claimed in claim 1, further comprising the step of modifying the request for the base file of the subfile, that the reply dataset cannot comprise any compressed data.

27. The method as claimed in claim 1, further comprising the step of buffering data from the reply dataset in the one or another one of the plurality of proxies for which caching is not allowed.

28. The method as claimed in claim 27, wherein said step of using the one or another one of the plurality of proxies includes using the buffered reply dataset only for replying to a limited number of further requests by the same client.

29. The method as claimed in claim 27, wherein said step of using the one or another one of the plurality of proxies includes using the buffered reply dataset only for replying to a limited number of further requests by the same client, and that the upper limit for the limited number of further requests is 1.

30. The method as claimed in claim 27, wherein said step of using the one or another one of the plurality of proxies includes buffering the buffered reply dataset only as long as the buffered reply dataset is requested by the client within a respective time interval each.

31. The method as claimed in claim 1, further comprising the steps of transmitting the storage information to the server proxy indicating which base file(s) and/or subfile(s) still is/are buffered, and evaluating in the server proxy the storage information received in order to suppress electronic requests for the base file or subfile still buffered and/or prevent forwarding of the base file or subfile still buffered from the server proxy.

32. The method as claimed in claim 1, further comprising the steps of generating the request for subfile of the base file by the client proxy and transmitting to the server, and aborting the request for the subfile in the client proxy when the client proxy receives at least parts of the subfile.

33. The method as claimed in claim 1, further comprising the step of executing prioritization for forwarding by forwarding the base file with preference in the server proxy.

34. The method as claimed in claim 33, further comprising the step of expanding a transmission bandwidth portion used for the forwarding of the base file.

35. The method as claimed in claim 1, further comprising the steps of providing the server and the server proxy comprised by a server-end and providing the client and the client proxy comprised by a client-end;

transmitting the request for the base file from the server proxy to the server together with address information identifying an inquiring client-end;

receiving the address information identifying the inquiring client-end in the server;

transmitting the request for the subfile from the server proxy to the server together with said address information or some other address information identifying the inquiring client-end;

receiving the request for the subfile and said address information or some other address information identifying the inquiring client-end in the server.

36. The method as claimed in claim 1, further comprising the step of transmitting the reply dataset and/or the status data between at least two of the plurality of proxies at least partly compressed.

37. The method as claimed in claim 1, further comprising the step of transmitting the reply dataset and/or the status data between at least two of the plurality of proxies at least partly encrypted.

38. A non-transitory computer-readable medium including a computer program for transmitting data in a system comprising a server means and a client means which are interconnected via a plurality of proxy means, including a server proxy means and a client proxy means, the non-transitory computer-readable medium comprising:

means recorded on an electronic data storage medium for generating a conditional request by the client means for a base file of a structured dataset to be fetched via the server means in the system and for transmitting the request to one of the plurality of proxy means, said conditional request comprising a condition;

means recorded on the electronic data storage medium for deriving a modified request for the base file from the conditional request in the one proxy means by changing the condition, the modified request being configured to always retrieve the base file from the server;

means recorded on an electronic data storage medium for transmitting the modified request for the base file from the one proxy means to the server means;

means recorded on the electronic data storage medium for receiving and analyzing the modified request for the base file in the server means;

means recorded on the electronic data storage medium for transmitting a reply dataset, including the base file, from the server means to the one or another one of the plurality of proxy means;

means recorded on the electronic data storage medium for receiving and analyzing the reply dataset by the one or the another one of the plurality of proxy means to determine information about a subfile of the base file; and means recorded on the electronic data storage medium for generating a request for the subfile of the base file by the one or the another one of the plurality of proxy means and for transmitting the request for the subfile to the server means when information about the subfile is determined by analyzing the base file.

\* \* \* \* \*